United States Patent
Buchanan et al.

(10) Patent No.: US 10,767,896 B2
(45) Date of Patent: Sep. 8, 2020

(54) HVAC SYSTEM

(71) Applicant: DENSO International America, Inc., Southfield, MI (US)

(72) Inventors: Matthew Buchanan, Royal Oak, MI (US); Michael Polus, Belleville, MI (US); Andrew Lanni, Ray, MI (US)

(73) Assignee: DENSO International America, Inc., Southfield, MI (US)

( * ) Notice: Subject to any disclaimer, the term of this patent is extended or adjusted under 35 U.S.C. 154(b) by 21 days.

(21) Appl. No.: 15/897,540

(22) Filed: Feb. 15, 2018

(65) Prior Publication Data
US 2019/0249898 A1 Aug. 15, 2019

(51) Int. Cl.
*F24F 13/14* (2006.01)
*F24F 13/10* (2006.01)
*F24F 13/15* (2006.01)
*B60H 1/00* (2006.01)

(52) U.S. Cl.
CPC ........ *F24F 13/1426* (2013.01); *F24F 13/105* (2013.01); *F24F 13/15* (2013.01); *B60H 1/00664* (2013.01); *F24F 2013/144* (2013.01)

(58) Field of Classification Search
CPC ........ B60H 1/00664; F24F 7/00; F24F 7/013; F24F 11/00; F24F 11/0001; F24F 13/08; F24F 13/10; F24F 13/105; F24F 13/14; F24F 13/1426; F24F 2013/144; F24F 13/15; G05D 23/08; F16K 31/002
USPC .................................. 165/59, 80.3; 236/93 R
See application file for complete search history.

(56) References Cited

U.S. PATENT DOCUMENTS

| | | | | |
|---|---|---|---|---|
| 3,343,473 A | * | 9/1967 | Gillick | B60H 1/00371 454/99 |
| 4,159,078 A | * | 6/1979 | Diermayer | F23N 3/047 236/1 G |
| 4,272,013 A | * | 6/1981 | Diermayer | F23N 3/047 137/62 |
| 4,290,554 A | * | 9/1981 | Hensley | F24F 13/15 236/101 D |
| 4,441,653 A | * | 4/1984 | Grudich | F23N 3/047 126/285 R |
| 6,128,188 A | * | 10/2000 | Hanners | H01L 23/34 361/694 |
| 6,330,157 B1 | * | 12/2001 | Bezama | H01L 23/473 361/704 |
| 6,405,543 B2 | * | 6/2002 | Kopko | F24F 3/14 62/89 |
| 7,082,684 B2 | * | 8/2006 | Hantschel | G01R 1/06727 29/874 |

(Continued)

*Primary Examiner* — Len Tran
*Assistant Examiner* — Gustavo A Hincapie Serna
(74) *Attorney, Agent, or Firm* — Harness, Dickey & Pierce, P.L.C.

(57) ABSTRACT

An airflow door for a heating, ventilation, and air conditioning (HVAC) system. The airflow door has a first material and a second material. The first material and the second material are temperature responsive materials that change shape at different temperatures such that at a first temperature the first material and the second material are shaped to provide the airflow door with a first configuration, and at a second temperature the first material and the second material are shaped to provide the airflow door with a second configuration that is different from the first configuration.

8 Claims, 5 Drawing Sheets

(56) References Cited

U.S. PATENT DOCUMENTS

| | | | | |
|---|---|---|---|---|
| 7,127,811 | B2* | 10/2006 | Mathieu | G01R 1/07378 |
| | | | | 29/846 |
| 7,778,029 | B2* | 8/2010 | Ueno | G11B 33/144 |
| | | | | 361/695 |
| 8,132,616 | B1* | 3/2012 | Brower | H05K 7/20272 |
| | | | | 165/101 |
| 9,266,406 | B2* | 2/2016 | Morikawa | B60H 1/00828 |
| 10,393,287 | B2* | 8/2019 | Baldea | G05D 23/1854 |
| 2005/0121946 | A1* | 6/2005 | McKnight | B60K 11/085 |
| | | | | 296/180.1 |
| 2009/0314265 | A1* | 12/2009 | Freese | F02M 26/28 |
| | | | | 123/568.12 |
| 2010/0089468 | A1* | 4/2010 | Scott | F01D 17/14 |
| | | | | 137/468 |
| 2014/0034266 | A1* | 2/2014 | Tabei | B60H 1/00764 |
| | | | | 165/42 |
| 2014/0302769 | A1* | 10/2014 | Sawada | F24F 13/082 |
| | | | | 454/315 |
| 2018/0355990 | A1* | 12/2018 | Simpson | F16K 31/002 |

* cited by examiner

HVAC SYSTEM

FIELD

The present disclosure relates to an HVAC system including multi-material doors for directing airflow.

BACKGROUND

This section provides background information related to the present disclosure, which is not necessarily prior art.

Heating, ventilation, and air conditioning (HVAC) systems include various doors for directing airflow. With current HVAC systems, the doors are operated by motors, cams, linkages, or any combination thereof, which can be time consuming to assemble and install, costly, and subject to failure on rare occasions. While such doors are suitable for their intended use, they are subject to improvement. For example, air mode doors that are easier to assemble and install, more cost effective, and less likely to experience failure would be desirable. The present disclosure includes air mode doors that provide for such advantages, as well as numerous others as explained herein and as one skilled in the art will recognize.

SUMMARY

This section provides a general summary of the disclosure, and is not a comprehensive disclosure of its full scope or all of its features.

The present disclosure includes an airflow door for a heating, ventilation, and air conditioning (HVAC) system. The airflow door has a first material and a second material. The first material and the second material are temperature responsive materials that change shape at different temperatures such that at a first temperature the first material and the second material are shaped to provide the airflow door with a first configuration, and at a second temperature the first material and the second material are shaped to provide the airflow door with a second configuration that is different from the first configuration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Figure 1A:
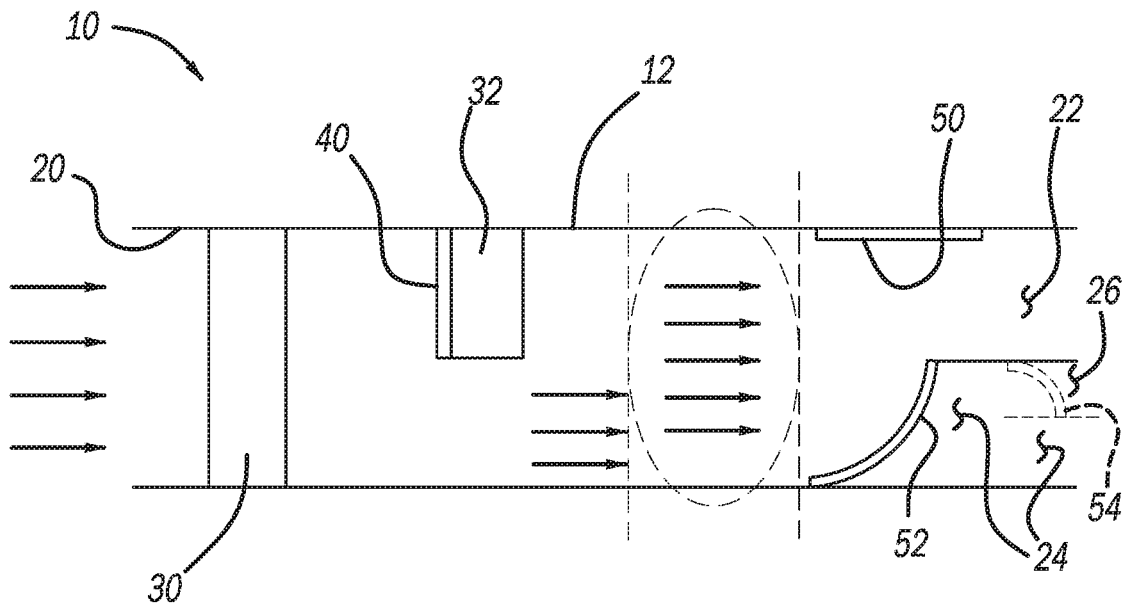
FIG. 1A illustrates portions of an HVAC system including air mode doors in accordance with the present disclosure.

Example embodiments will now be described more fully with reference to the accompanying drawings.

FIG. 1 illustrates an exemplary heating, ventilation, and air conditioning (HVAC) system 10. The HVAC system 10 can be configured for use in any suitable application. For example, the HVAC system 10 can be configured for use in any suitable vehicle, such as any suitable passenger vehicle, recreational vehicle, commercial vehicle, mass transit vehicle, military vehicle, construction equipment, agricultural equipment, watercraft, aircraft, etc. The HVAC system 10 may also be used with any suitable non-vehicular application, such as a building HVAC system. The HVAC system 10 includes a case 12. The case 12 defines an inlet 20 through which airflow flows into the case 12. Airflow exits the case 12 through one or more outlets defined by the case 12. Any suitable number of, and type of, outlets may be included, such as, but not limited to, a face outlet 22, a foot outlet 24, and an optional defrost outlet 26 (illustrated in phantom as optional), each of which are defined by the case 12.

The HVAC system 10 further includes an evaporator 30 and a heater core 32, each of which are within the case 12. In the example illustrated, the evaporator 30 extends entirely across the case 12, and the heater core 32 extends partially across the case 12. The evaporator 30 is arranged between the inlet 20 and the heater core 32. Thus all airflow to the heater core 32 also flows through the evaporator 30.

Figure 1B:
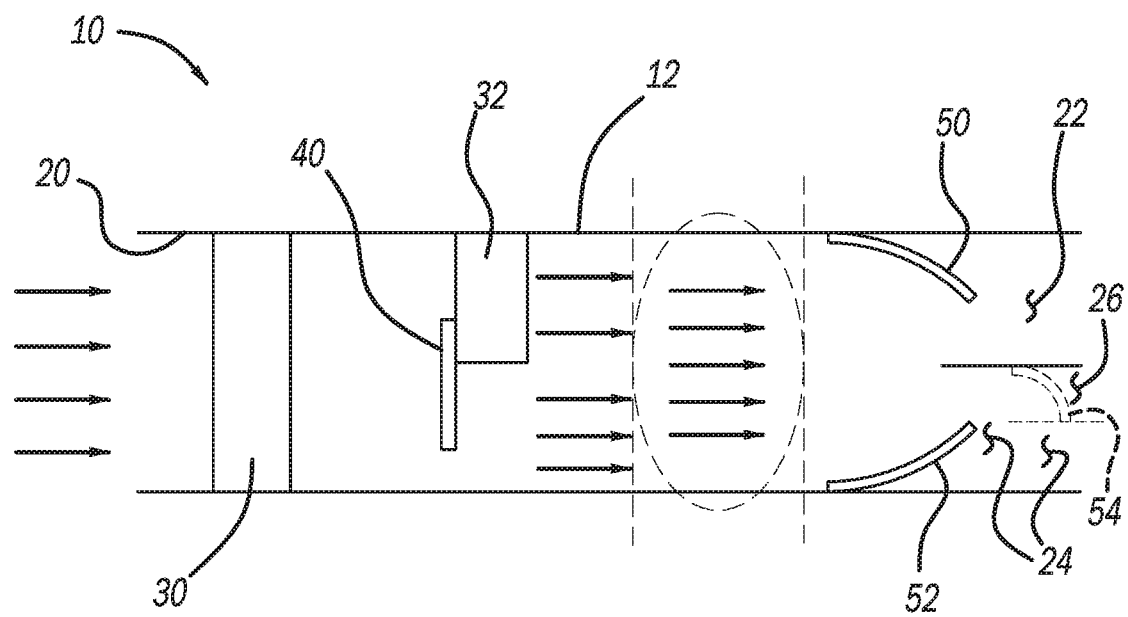
FIG. 1B is similar to FIG. 1A, but with the air mode doors in different positions.

Airflow through the heater core 32 is controlled by any suitable air mix door 40. Although the air mix door 40 is illustrated as a sliding door, the air mix door 40 may be a rotating door or any other suitable type of door. The air mix door 40 is movable by any suitable actuation device, such as a servo. The actuation device can be controlled by any suitable HVAC control module. Arranging the air mix door 40 in the position of FIG. 1A prevents airflow through the heater core 32. FIG. 1B illustrates the air mix door 40 having been rotated from the closed position of FIG. 1A to a partially open position, which allows airflow through the heater core 32. In the mode of FIG. 1A, which is generally known as a face mode, the lack of airflow through the heater core 32 results in airflow flowing from the case 12 being at a temperature that is lower as compared to airflow flowing from the case 12 when the air mix door 40 is partially open as illustrated in the mode of FIG. 1B, which is generally known as a bi-level mode.

The HVAC system 10 further includes a first air mode door 50 arranged at the face outlet 22, and a second air mode door 52 arranged at the foot outlet 24. Although the exemplary HVAC system 10 includes two air mode doors 50 and 52, any suitable number of air mode doors may be included depending on the application. In applications including the defrost outlet 26, the defrost outlet 26 may be arranged at any suitable position of the case 12. For example and as illustrated in FIGS. 1A and 1B, the defrost outlet 26 may extend from the foot outlet 24, downstream of the second air mode door 52. A third air mode door 54 (illustrated in phantom as optional) may be located near or at the junction between the foot outlet 24 and the defrost outlet 26 to control airflow through the defrost outlet 26. The third air mode door 54 may be any suitable air mode door, including at least a first material 60 and a second material 62 (described herein) that change shape in response to changes in temperature, thereby opening and closing the third air mode door 54 by changing the shape thereof.

The first air mode door 50 and the second air mode door 52 move in response to changes in temperature without the need for an actuator, without unnecessary linkages, and without having to be connected to an HVAC control module. Specifically and with additional reference to FIGS. 2A and 2B, the first air mode door 50 will now be described in additional detail. The first and second air mode doors 50 and 52 can be the same or substantially similar, and thus the description and illustration of the first air mode door 50 also applies to the second air mode door 52.

The first air mode door 50 includes a support 70, which can be mounted to the case 12 to support the first air mode door 50 within the case 12. Mounted to the support 70 is a first material 60 and a second material 62. The first and second materials 60 and 62 are temperature responsive materials that have different rates of thermal expansion, which results in the first and second materials 60 and 62 changing shape in response to changes in temperature. The first and second materials 60 and 62 may be any suitable materials with different rates of thermal expansion, such as any suitable metallic or polymeric materials. Suitable materials include, but are not limited to, brass, steel, copper, etc. The first and second materials 60 and 62 may be secured together in any suitable manner, such as by welding. The first air mode door 50 may include any suitable number of materials, and is not limited to the first and second materials 60 and 62. For example, the first air mode door 50 may include three or more different materials secured together in any suitable manner, such as by welding.

Figure 2A:
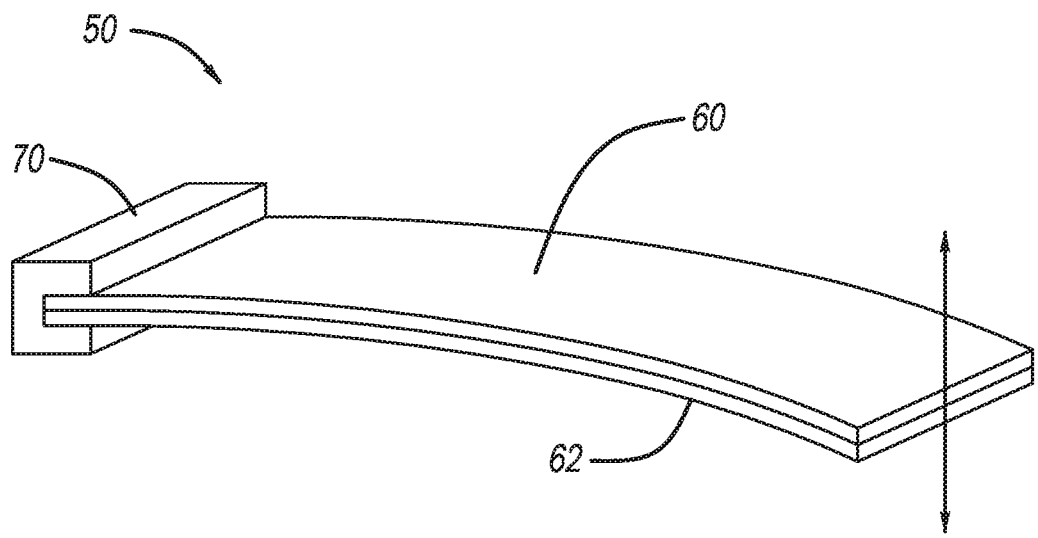
FIG. 2A is an isolated view of an exemplary air mode door in accordance with the present disclosure.
Figure 2B:
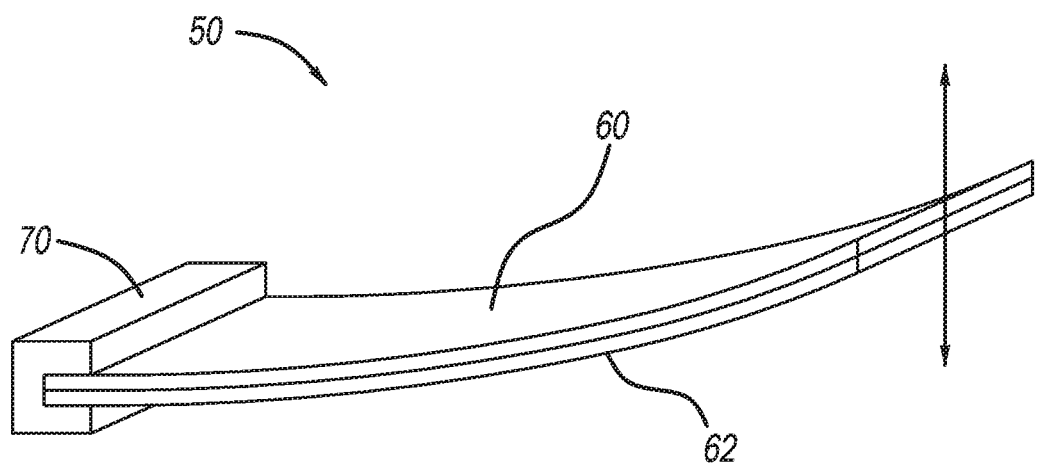
FIG. 2B is similar to FIG. 2A, but with the air mode door in a different position.

The different rates of thermal expansion of the first and second materials 60 and 62 results in the first and second materials 60 and 62 changing shape in response to changes in temperature, such that at a first temperature the first material 60 and the second material 62 are shaped to provide the first air mode door 50 with a first configuration (see FIG. 2A for example). At a second temperature different from the first temperature, the first material 60 and the second material 62 are shaped to provide the first air mode door 50 with a second configuration (FIG. 2B) that is different from the first configuration.

With renewed reference to FIGS. 1A and 1B, the first air mode door 50 and the second air mode door 52 can include materials with different rates of thermal expansion allowing the first and second air mode doors 50 and 52 to have different configurations at particular temperatures. For example and as illustrated in FIG. 1A, at a relatively cool airflow temperature resulting from the air mix door 40 being closed, the first and second materials 60 and 62 of the first air mode door 50 are configured to have a generally linear shape to open the face outlet 22. In contrast, the first and second materials of the second air mode door 52 are configured to provide the second air mode door 52 with a curved shape to close the foot outlet 24. Thus in this face mode of FIG. 1A, the relatively cool airflow is directed to the face of a person exposed to airflow from the case 12, such as an occupant in a front seat of a vehicle.

With reference to FIG. 1B, the first and second materials 60 and 62 of the first air mode door 50 can be configured such that when exposed to airflow that is relatively warmer than the airflow experienced in the face mode of FIG. 1A due to the air mix door 40 being partially open in FIG. 1B, the first air mode door 50 assumes a curved shape that partially closes the face outlet 22. The materials of the second air mode door 52 are configured such that when exposed to the relatively warmer airflow of FIG. 1B, the second air mode door 52 assumes a curved shape that results in the foot outlet 24 being partially closed. Thus in this bi-level mode of FIG. 1B, the first and second air mode doors 50 and 52 direct airflow to both the face and feet of the occupant of the vehicle passenger cabin.

The first and second materials 60 and 62 of the first air mode door 50 are also configured to assume a curved shape resulting in the first air mode door 50 completely closing the face outlet 22 when exposed to airflow that is warmer than the airflow resulting from the configurations of FIGS. 1A and 1B, such as when the air mix door 40 is fully opened. The first and second materials of the second air mode door 52 are configured to assume a shape that will fully open the foot outlet 24 (such as a linear or generally linear shape) when the air mix door 40 is fully open to direct all airflow through the heater core 32. Thus in this foot mode the face outlet 22 is closed and the foot outlet 24 is open to direct warm air towards the feet of occupants of the vehicle.

Figure 3:
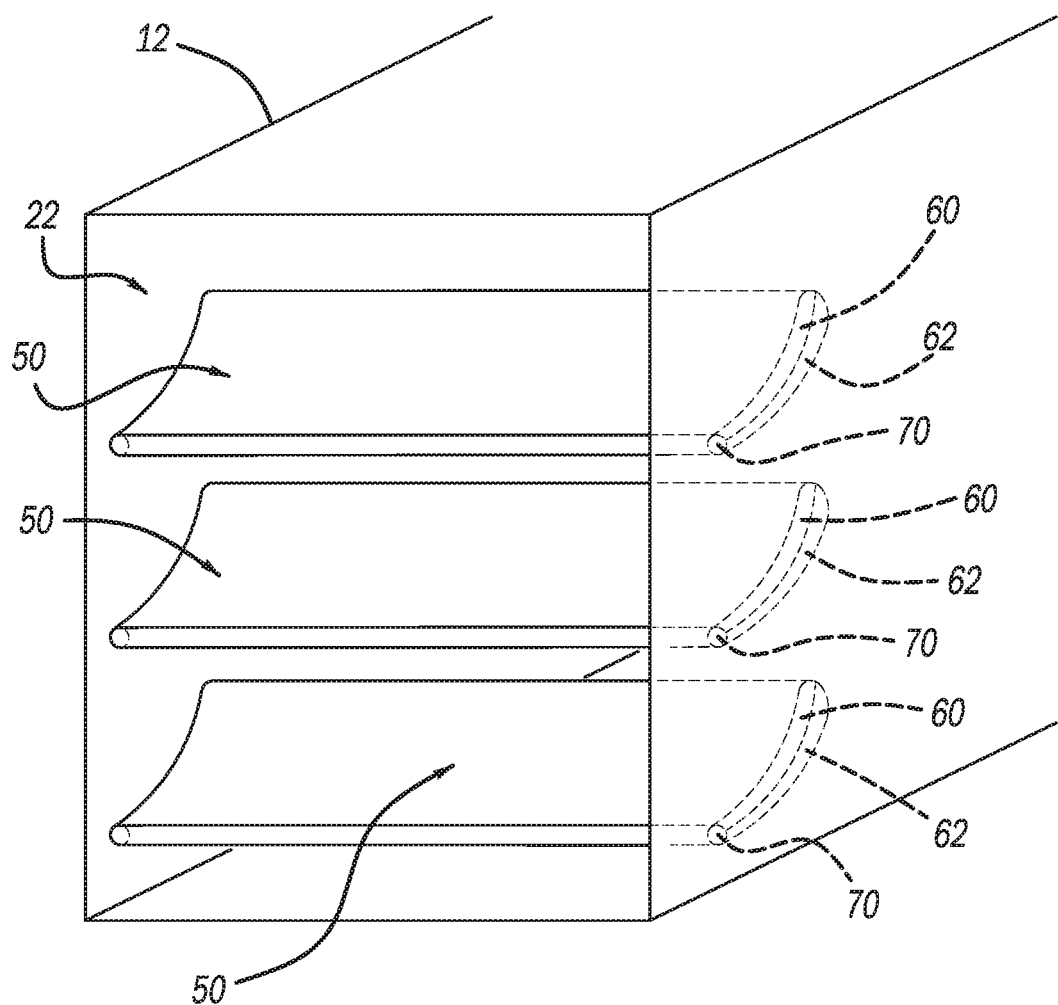
FIG. 3 is a perspective view of additional exemplary air mode doors in accordance with the present disclosure.

FIGS. 1A and 1B illustrate one first air mode door 50 at the face outlet 22 and one second air mode door 52 at the foot outlet 24. In some applications, however, the face outlet 22 may include multiple first air mode doors 50 and the foot outlet 24 may include multiple second air mode doors 52. For example and as illustrated in FIG. 3, multiple first air mode doors 50 may be linearly arranged at the face outlet 22 with the supports 70 thereof being connected to opposite sides of the case 12 to support the first air mode doors 50 at the face outlet 22. A plurality of the second air mode doors 52 may be arranged at the foot outlet 24 in a similar manner.

Figure 4A:
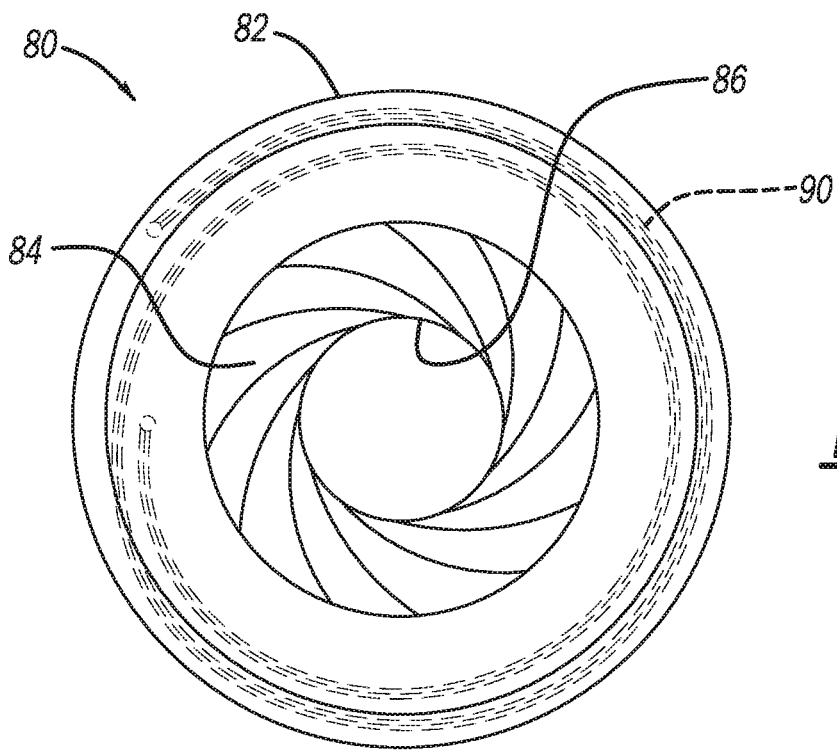
FIG. 4A is an isolated view of another exemplary air mode door in accordance with the present disclosure.
Figure 4B:
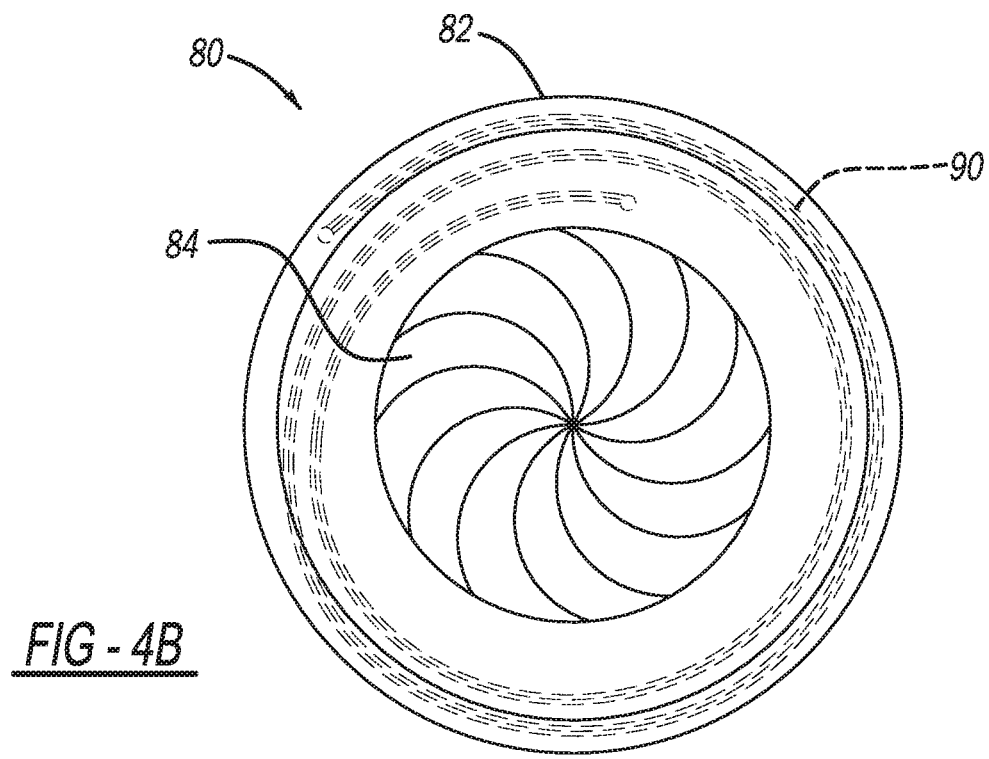
FIG. 4B is similar to FIG. 4A, but with the air mode door in a different position.

With additional reference to FIGS. 4A and 4B, one or both of the first and second air mode doors 50 and 52 may be replaced with an aperture door 80. The aperture door 80 includes a housing 82, which houses a plurality of panels 84. The panels 84 are movable into and out of the housing 82. When the plurality of panels 84 are retracted into the housing, the panels 84 define an opening 86. The plurality of panels 84 effectively close the opening 86 when the panels 84 are extended.

The plurality of panels 84 are moved by a strip 90 arranged within the housing 82. The strip 90 has a generally circular shape, and is coupled directly or indirectly to one or more of the plurality of panels 84 in any suitable manner such that movement of the strip 90 moves the panels 84 to open and close the opening 86. The strip 90 is a multi-material strip including any suitable materials having different rates of thermal expansion, such as the first material 60 and the second material 62 arranged in a circular manner. The strip 90 changes shape in response to being exposed to airflow at different temperatures, as described above with respect to the first and second materials 60 and 62, in order to open and close the opening 86, which will open and close the face outlet 22 or the foot outlet 24 depending on whether the aperture door 80 is arranged at the face outlet 22 or the foot outlet 24. Each one of the face outlet 22 and the foot outlet 24 may include an aperture door 80.

Figure 5A:
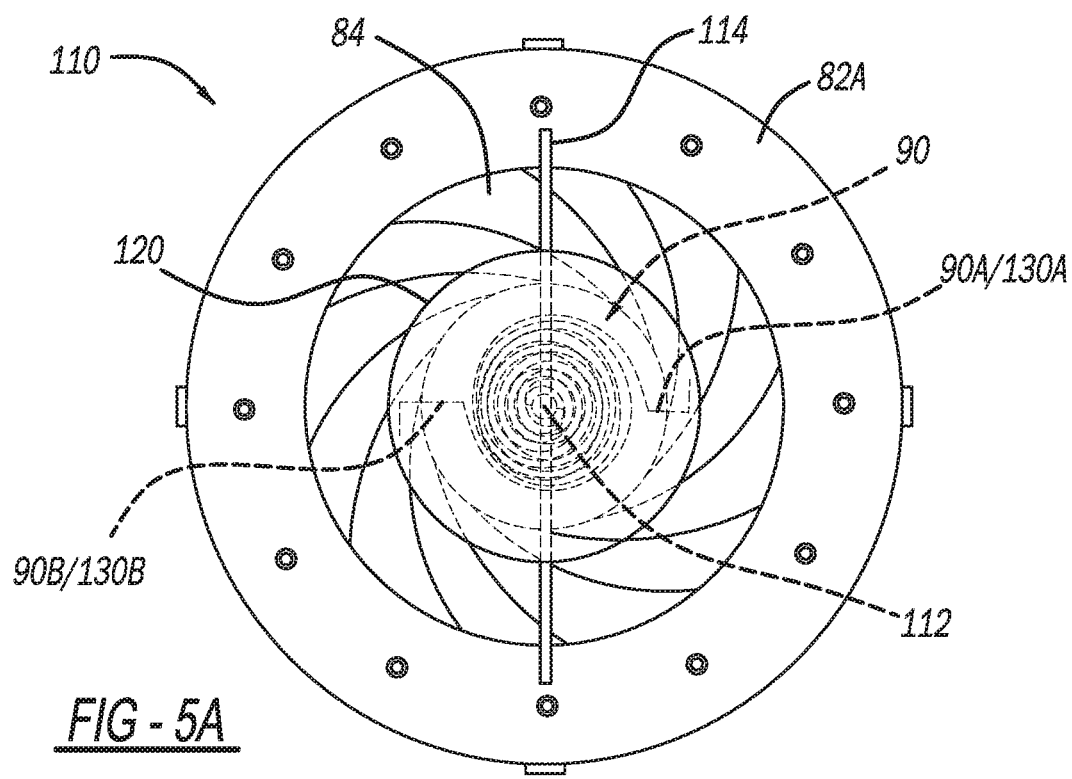
FIG. 5A is an isolated view of yet another exemplary air mode door in accordance with the present disclosure.
Figure 5B:
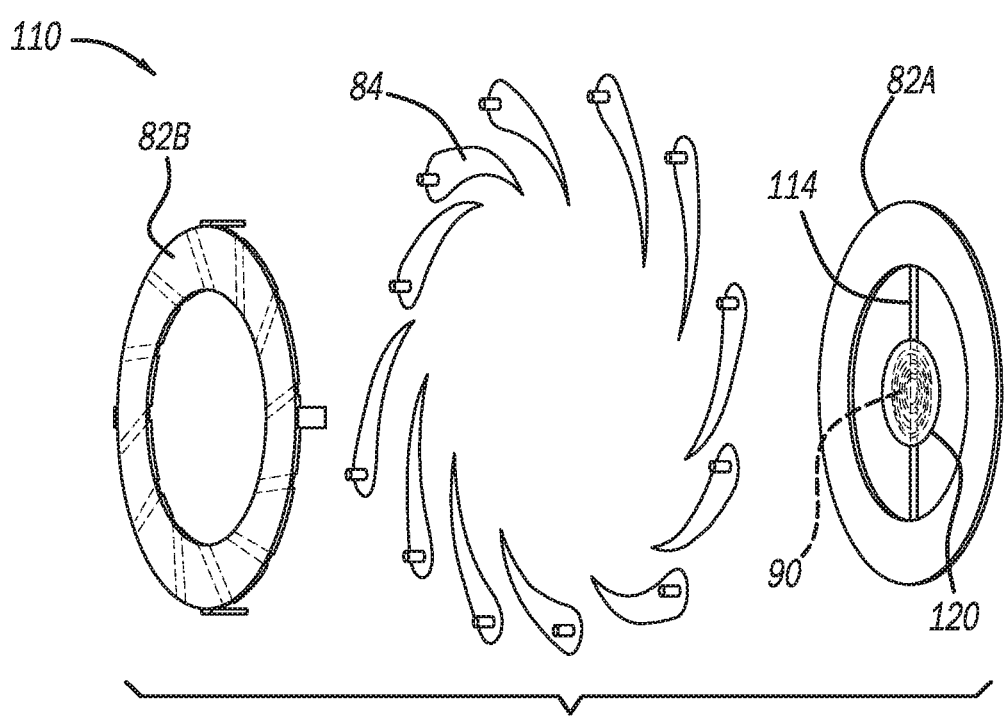
FIG. 5B is an exploded view of the door of FIG. 5A.

With reference to FIGS. 5A and 5B, another aperture door in accordance with the present disclosure is illustrated at reference number 110. The aperture door 110 includes the strip 90 separated into a first portion 90A and a second portion 90B, each of which are spaced apart and coupled to a post 112. The post 112 is mounted to a support rod 114, which is mounted to a first half 82A (which is opposite to a second half 82B) of the housing 82. The panels 84 are anchored between the first half 82A and the second half 82B in any suitable manner such that rotation of the first half 82A relative to the second half 82B moves the panels 84 into and out of the housing 82. The first portion 90A and the second portion 90B of the strip 90 are contained within a case 120. End portions 130A and 130B of the first and second portions 90A and 90B respectively are secured to the case 120 (or otherwise retained), so that the first and second portions 90A and 90B rotate the post 112, which rotates the rod 114 and the first half 82A of the housing 82, which thereby moves the panels 84 into, or out of, the housing 82 depending on whether the first half 82A is rotated clockwise or counter-clockwise.

The present disclosure thus advantageously provides for doors 50, 52, and 80 for an HVAC system 10. The doors 50, 52, 80, and 110 open and close in response to the temperature responsive materials (such as first and second materials 60 and 62) thereof changing shape when exposed to airflow of different temperatures. The temperature responsive materials 60 and 62 having different rates of thermal expansion advantageously eliminates the need for mechanical actuators (such as servos), mechanical linkages, and electrical linkages to an HVAC control module. Thus the air mode doors 50, 52, 80, and 110 in accordance with the present disclosure advantageously reduce cost and decrease assembly time, as well as increase reliability. The present disclosure includes any type of airflow control device including the first and second temperature responsive materials 60 and 62, and is not limited to the specific doors 50, 52, 80, and 110. One skilled in the art will appreciate that the present disclosure provides numerous additional advantages and unexpected results.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) system comprising:
  a case defining an inlet, a face outlet, and a foot outlet;
  an evaporator and a heater core within the case;
  an air mix door movable to control airflow through the heater core;
  a first air mode door including a first material and a second material that have different rates of thermal expansion to provide the first air mode door with different configurations at different temperatures, the first material and the second material are connected to a first support that is mounted within the case at the face outlet;
  a second air mode door including a third material and a fourth material that have different rates of thermal expansion to provide the second air mode door with different configurations at different temperatures, the third material and the fourth material are connected to a second support that is mounted within the case at the foot outlet.

2. The HVAC system of claim 1, wherein upon exposure to airflow of a first temperature:
- the first material and the second material of the first air mode door provide the first air mode door with a shape that fully opens the face outlet; and
- the third material and the fourth material of the second air mode door provide the second air mode door with a shape that closes the foot outlet.

3. The HVAC system of claim 2, wherein upon exposure to airflow of a second temperature that is warmer than the first temperature:
- the first material and the second material of the first air mode door provide the first air mode door with a shape that partially opens the face outlet; and
- the third material and the fourth material of the second air mode door provide the second air mode door with a shape that partially opens the foot outlet.

4. The HVAC system of claim 3, wherein upon exposure to airflow of a third temperature that is warmer than both the first temperature and the second temperature:
- the first material and the second material of the first air mode door provide the first air mode door with a shape that closes the face outlet; and
- the third material and the fourth material of the second air mode door provide the second air mode door with a shape that fully opens the foot outlet.

5. The HVAC system of claim 1, further comprising a third air mode door at a defrost outlet to control airflow therethrough, the third air mode door including a fifth material and a sixth material having different rates of thermal expansion to provide the third air mode door with different configurations at different temperatures.

6. The HVAC system of claim 1, wherein the first air mode door is one of a plurality of first air mode doors at the face outlet, and the second air mode door is one of a plurality of second air mode doors at the foot outlet.

7. The HVAC system of claim 1, wherein each one of the first material, the second material, the third material, and the fourth material is one of brass, steel, copper, iron, or a polymer.

8. The HVAC system of claim 1, wherein the first material is welded to the second material, and the third material is welded to the fourth material.

* * * * *